United States Patent [19]

Schoales

[11] Patent Number: 4,843,710
[45] Date of Patent: Jul. 4, 1989

[54] METHOD FOR SEPARATING THE PLATES OF A BATTERY

[76] Inventor: David R. Schoales, 4209 Urbino St., Sebring, Fla. 33872

[21] Appl. No.: 209,595

[22] Filed: Jun. 21, 1988

[51] Int. Cl.$^4$ .............................................. H01M 2/18
[52] U.S. Cl. .................................. 29/623.1; 429/145; 429/147
[58] Field of Search ............... 429/145, 131, 144, 249, 429/147, 50, 247; 29/623.1

[56] References Cited

U.S. PATENT DOCUMENTS

| | | | |
|---|---|---|---|
| 3,216,862 | 11/1965 | Parker et al. ................ | 429/147 X |
| 3,351,495 | 11/1967 | Larsen et al. ................ | 429/252 |
| 3,787,240 | 1/1974 | Gillman et al. .............. | 429/145 |
| 4,000,352 | 12/1976 | Hollenbook et al. .......... | 429/147 |
| 4,153,759 | 5/1979 | Murata et al. ............... | 429/147 |

Primary Examiner—Anthony Skapars
Attorney, Agent, or Firm—Ronald E. Smith; Joseph C. Mason, Jr.

[57] ABSTRACT

A flexible, semi-permeable membrane is positioned intermediate the positive and negative plates of a lead acid battery. Electrolyte passes through the membrane by osmosis, but metallic ions are blocked. The membrane is sandwiched between and protected by flexible sheet material members formed of a macroporous material.

12 Claims, 3 Drawing Sheets

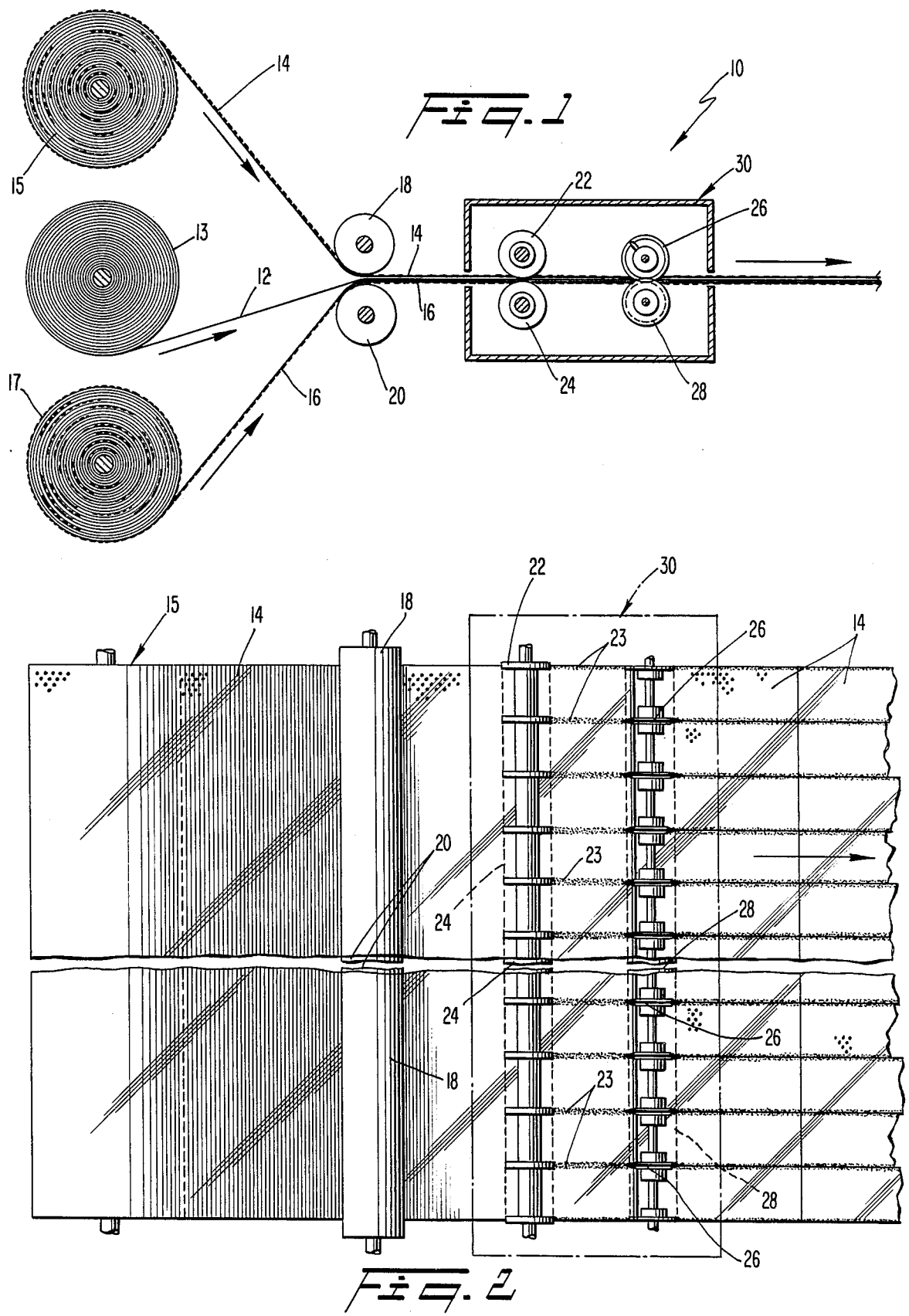

Fig. 3
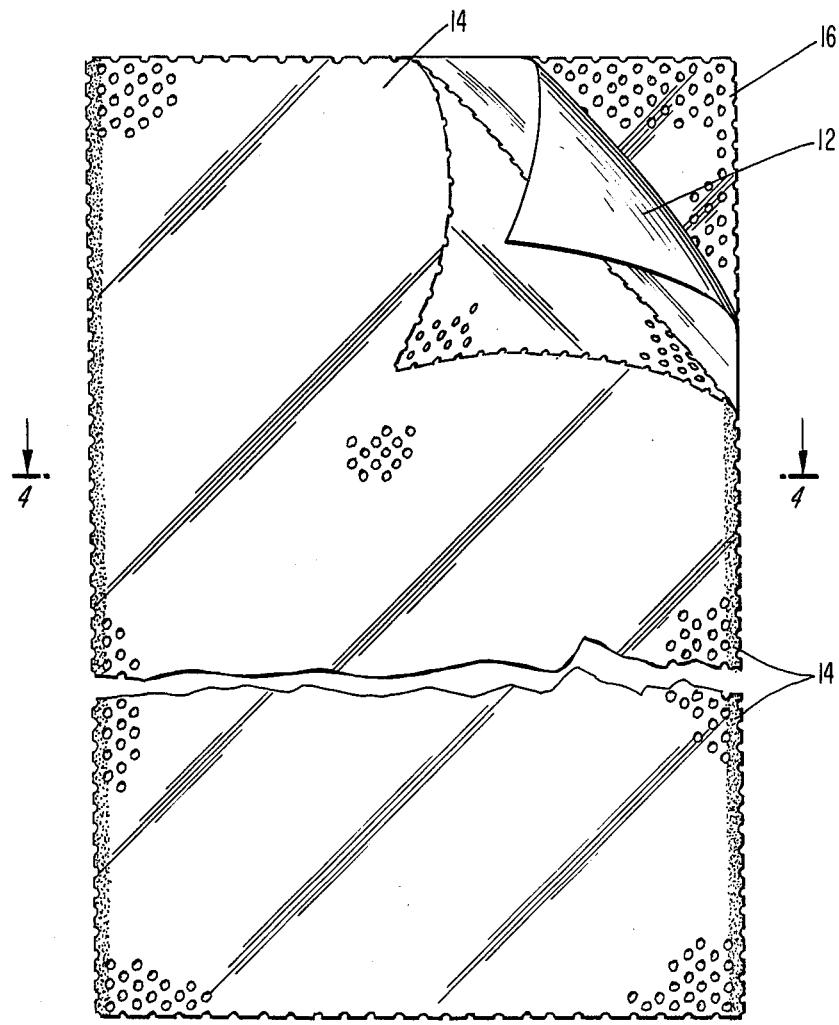
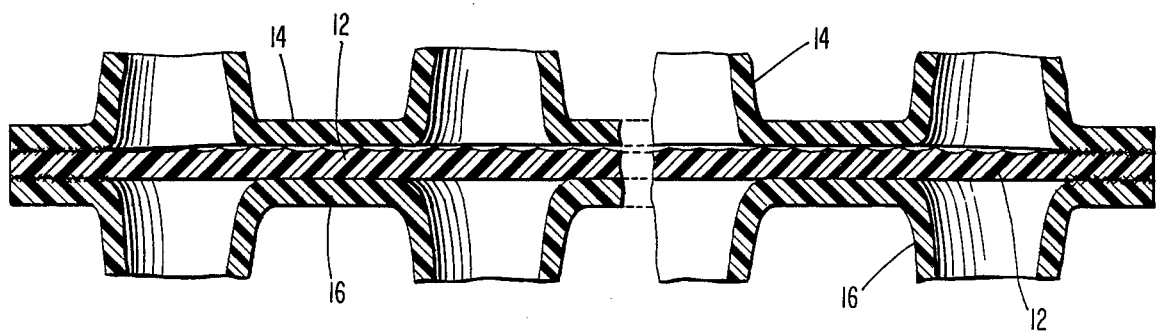
Fig. 4

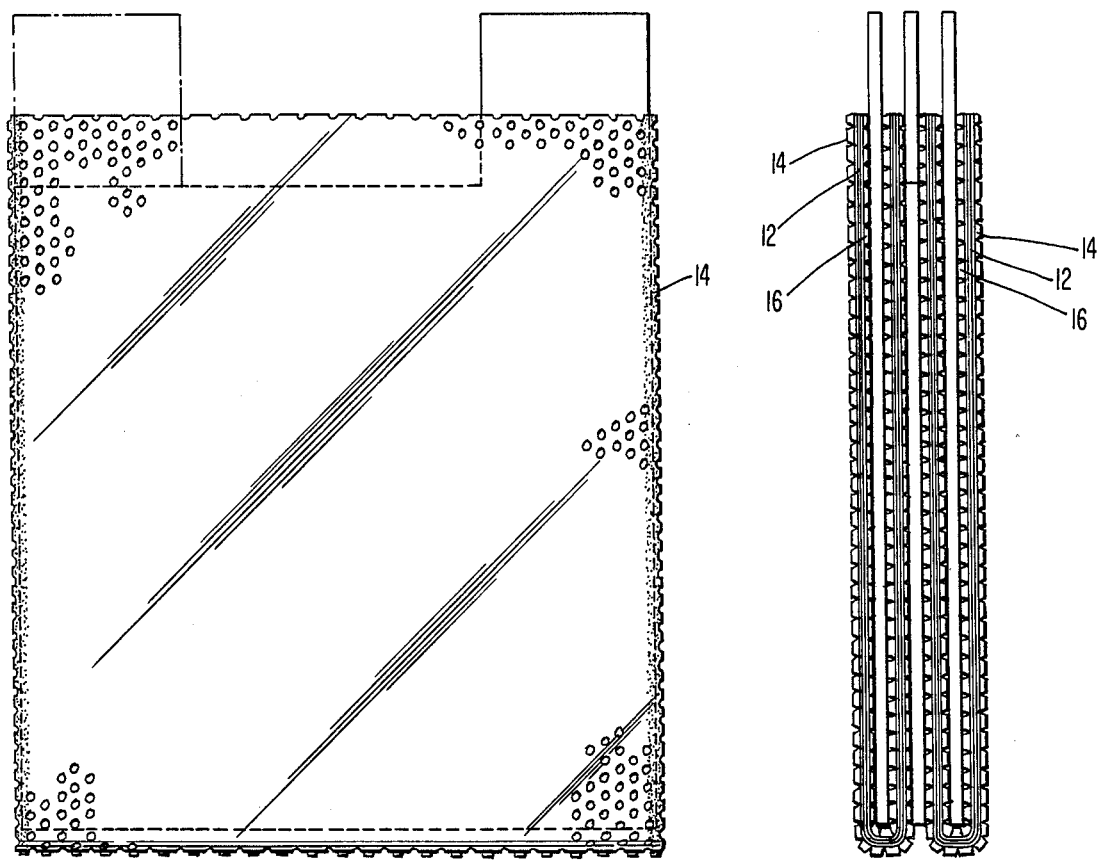
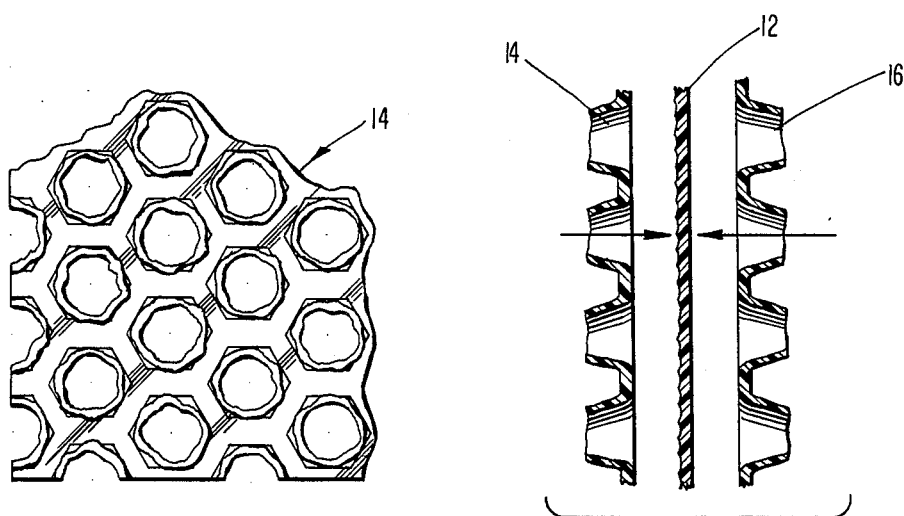

METHOD FOR SEPARATING THE PLATES OF A BATTERY

TECHNICAL FIELD

This invention relates, generally, to devices having utility in maintaining the separation of positive and negative plates from one another in lead acid batteries. More particularly, it relates to a battery separator in the form of a semipermeable membrane having pores so small that the chemical activity within the battery must occur by osmosis.

BACKGROUND ART

Lead acid batteries include a plurality of closely spaced positive and negative plate members that are disposed in an electrolyte such as sulfuric acid.

Separator members are disposed between each pair of contiguous plates to prevent them from contacting one another. The separators must be constructed to allow electrolytic flow within the battery, i.e., the separators must not prevent the chemical action of the battery that produces the current. Lead acid batteries are often used in environments where high vibrations are experienced. Thus, separators must be capable of absorbing vibration. Many battery separators are known. For example, U.S. Pat. No. 3,351,495 to Larson, et. al. shows a battery separator for a lead acid battery where the separator is made from a mixture of high and lower molecular weight polyethylene to form a flexible separator.

Another battery separator made from a mixture of high and lower molecular weight polyethylene is shown in U.S. Pat. No. 4,190,707 to Doi, et. al. Moreover, U.S. Pat. No. 4,731,304 to Lundqist also discloses a mixture of high and lower molecular weight polyethylene for forming battery separators.

Other U.S. Pat. Nos. of interest include 4,024,323 to Versteegh, 4,588,633 to Kono, et. al., 4,283,442 to Machi, et. al., 3,544,384 to Sundberg, 3,228,802 to Rabl, 4,024,213 to Honda, 4,234,623 to Moshtev, 3,787,240 to Gillman, 4,201,838 to Goldberg, 4,626,468 to Sundet, and a Japanese patent No. 53-41112.

The electrical resistance between the plates of a battery increases directly proportional to the square of the distance between the plates, i.e., the inverse square law applies to the current produced by the battery. Current produced drops in proportion to the square of the distance between the plates.

More specifically, the following data has been compiled for prior art separators which are fifty percent porous and which have seven ribs;

| Plate Spacing | Spacing Squared | Equivalent Separator Mass | Electrolyte Space Available |
|---|---|---|---|
| .045 | .002 | .020 | .025 |
| .040 | .0016 | .020 | .020 |

There is a need for an improved separator that can reduce the plate spacing substantially without adversely affecting battery performance, but the prior art neither teaches nor suggests how plate spacings could be reduced any further without affecting battery performance.

DISCLOSURE OF INVENTION

The negative and positive plates of a lead acid battery are separated by a flexible semi-permeable membrane of microporous construction that in turn may be sandwiched between a pair of flexible protective members of macroporous construction.

The membrane and its protective members are formed of materials that are impervious to the environment of a lead acid battery.

To make the semi-permeable membrane, a mixture of high and medium density or low density polyethylene is first formed into a thin sheet. Pores are created in the film and erupted. The process of erupting the pores increases the thickness of the material by a factor of 8-10 times.

The protective members may be formed by the same process, generally. Instead of increasing the thickness of the polyethylene material 8-10 times, however, the material is treated until its apparent thickness has increased about 20 times relative to the thickness of the original thin film. As a result of this enlargement, the protective materials have a macroporous structure, as distinguished from the microporous structure of the semipermeable membrane.

An object of this invention is to advance the art of battery separators by providing separators that occupy less volume than the separators of the prior art. The space saved by constructing a lead acid battery with the separators of this invention can be occupied by additional positive and negative plates or additional electrolyte or a combination of both, so that a battery of the same size can produce more current. Moreover, by enabling the closer spacing of the plates, the resistance therebetween is reduced, thereby further increasing the efficiency of the battery.

Another object is to provide a lead acid battery that performs better in cold weather than conventional lead acid batteries. The microporous structure of the semipermeable membrane permits high concentrations of sulfates in the vicinity of the negative plates which serve to prevent icing thereof.

The structure of the membrane also produces high sulfate concentrations near the positive plates as well. This increases battery efficiency by enabling faster adsorption rates of the sulfates by said positive plates.

The present separator structure is expected to enable battery operation in high vibration environments.

Other advantages and objects of this invention will become apparent as this description proceeds.

The invention accordingly comprises the features of construction, combination of elements and arrangement of parts that will be exemplified in the descriptions set forth hereinafter and the scope of the invention will be set forth in the claims.

BRIEF DESCRIPTION OF DRAWINGS

For a fuller understanding of the nature and objects of the invention, reference should be made to the following detailed description, taken in connection with the accompanying drawings, in which:

FIG. 1 is a side elevational, diagramatic representation showing how a preferred form of the battery separator is made;

FIG. 2 is a top plan view of the structure shown in FIG. 1;

FIG. 3 is a front view of a battery separator made in accordance with the teachings of this invention, showing two layers of material folded back;

FIG. 4 is an enlarged transverse sectional view taken along line 4—4 in FIG. 3;

FIG. 5 is a front elevational view of the novel battery separator disposed in wrapped relation to battery plates;

FIG. 6 is a side elevational view of the assembly shown in FIG. 5;

FIG. 7 is an enlarged view of a portion of a macroporous material; and

FIG. 8 is an enlarged, blown up view of the novel battery separator.

Similar reference numerals refer to similar parts throughout the several views of the drawings.

BEST MODES OF CARRYING OUT THE INVENTION

Referring now to FIG. 1, there it will be seen that an illustrative apparatus capable of producing a preferred form of the invention is designated by the reference numeral 10 as a whole.

A semi-permeable flexible membrane 12, stored as a sheet material in rolled configuration as at 13 on a suitable rotatably mounted spindle means, is unrolled and passed between guide roller means 18, 20.

Simultaneously, flexible macroporous members 14, 16, stored as sheet material in rolled configuration as at 15, 17, respectively, are fed through the same guide rollers 18, 20, as shown in FIG. 1, to form a sandwich of the members 12, 14 and 16.

The novel battery separator shown in FIGS. 3-8 is produced in part by sealing transversely and equidistantly spaced parallel narrow areas, collectively designated 23 in FIG. 2, of the materials 12, 14, 16 by sealing means denoted 22, 24 in FIGS. 1 and 2. The sealing means 22, 24 may include heat sealling, ultrasonic sealing, and the like.

Cutting means 26, 28 may then be employed to separate the sandwiched materials into elongate strips as shown in FIG. 2, and still further cutting means could be employed to form equidistantly spaced, transversely disposed cuts in each strip to produce the individual battery separators.

However, box 30 in FIG. 1 is intended to indicate that the sealing and cutting means can be performed at a single station by a single means, i.e., it is not necessary to perform the edge sealing and the longitudinal and transverse cuts at separate stations. Means for simultaneously cutting and sealing rolled materials into individual members are old in the art and form no part of the invention, per se.

The microporous semi-permeable membrane 12 is shown positioned between the macroporous members 14, 16 in FIG. 3; membranes 14, 16 may or may not be identical in material content and structure. The individual battery separator of FIG. 3 is produced by the apparatus of FIGS. 1 and 2; its length and width can be varied as needed.

It should be observed that the art of battery separators is advanced first of all by the disclosure of membrane 12 because, as will become more clear as this description continues, an improved lead acid battery can be constructed by placing a membrane 12 between each plate of the battery, without using protective members 14, 16 at all. However, the best mode of carrying out the invention includes protecting member 12 with members 14, 16.

Moreover, it should be noted that membrane 12 may be protected by plural layers of protective members 14, 16, i.e., the invention is not limited to the illustrated embodiment but also contemplates the use of additional layers of protective members 14, 16 if desired, or if required in a particular application. Additional roller members positioned outwardly of roller means 15, 17 in FIG. 1 would provide additional layers of the protective members 14, 16.

Members 12, 14 and 16 may be created from a thin imperforate film, about 0.001-0.002 inches thick, of formable material. A suitable material from which both the membrane and its protective members can be made is sold by Ethyl Corporation under the mark VisQueen.

The material selected, in addition to being formable, must be able to withstand the hostile environment of a lead acid battery, i.e., it must be resistant at battery operating temperatures to sulfuric acid, it must exhibit thermal stability, electrical resistance, and it must have the ability to hold a charge. Moreover, it must contain no fugitive materials harmful to the battery.

If used in a vibrating environment, as is the case with most lead acid batteries, it must also be capable of absorbing vibrations and withstanding the impact of the plates there-against. The material must not abrade the battery plates, nor may the material be susceptible to abrasion by the battery plates. The preferred material for both the membrane 12 and protective members 14, 16 is a mixture of high and low or medium density polyethylene. For example, high and low density polyethylene may be compounded together and put through a conventional film extruder. Those skilled in the pertinent art, once aware of this teaching, will appreciate the fact that the exact formulation will vary with varying battery structures.

Other suitable materials which can be formed into membrane 12 include fibers which may be matted, and sintered plastic. Rubber or resins may also be compounded with fugitive materials to produce the membrane.

The protective members 14, 16 may be made from fibrous matting, glass, protected cellulose, plastic fiber, balloon connected hole foams, expanded materials and other materials which are suggested to those skilled in the art of materials by this disclosure.

The macroporous nature and relative thickness of the protective members 14, 16 provides space for the electrolyte to occupy.

Regardless of the starting material used, the material may be drawn into a film about 0.001-0.002 inches thick, as aforesaid. Pores are then formed in the material. The pore erupting process is a pneumatic eruption process, i.e., the non-porous film is placed in overlying relation to a wire mesh and a negative pressure is supplied to the opposite side of the mesh. The pressure differential across the film causes pores to erupt; at each point of eruption, an open coned pore (which opens in the direction of the negative pressure) is formed. Air cools and sets the open-coned pore. The now-perforated material is removed from the wire mesh and stored in a rolled configuration until used in the manner depicted in FIGS. 1 and 2.

FIG. 4 depicts the open-coned pores in greatly enlarged detail; the pores in the macroporous materials 14, 16 may extend outwardly from membrane 12 as shown, or they may face inwardly. The pores formed in membrane 12 provide the spacing between the membrane and one of its protective members as is depicted. It should be understood that the orientation of the cones shown in the drawings is merely illustrative; many other patterns or orientations are within the scope of this invention.

The apparent gauge of the film is multiplied 6-10 times by the pore eruption process to produce the semipermeable membrane 12; the longitudinal extent of the cone walls provides the increased thickness.

To produce protective members 14, 16, the apparent gauge of the thickness of the thin film is multiplied up to 20 times by the cones; again, the increase in thickness is substantially equal to the longitudinal extent of the conical sidewalls of the erupted pores.

When the pore-erupting process is complete, the semipermeable membrane 12 has 4,000-5,000 coned pores per square inch; the macroporous members 14, 16 have about 80-1,800 coned pores per square inch. The diameter of the pores in the semi-permeable membrane is about 0.005 inch and the diameter of the pores in the macroporous material is about 0.075-0.25 inch. Moreover, the thickness of membrane 12 will be about .00125 inch and the thickness of the macroporous members will be about 0.001-0.002 inch.

The pores in the semi-permeable membrane 12 are so small that the electrolyte in the battery can pass therethrough only by the process of osmosis. More specifically, the electrolyte in a lead acid battery, sulfuric acid, breaks down into hydrogen ions and sulfates during the operation of the battery. The sulfates travel to and from the positive plates of the battery when the battery is being charged or discharged, and are released back into the electrolyte during the battery's discharge.

The coned pores in membrane 12 allow the sulfate ions to pass therethrough, as aforesaid, by the process of osmosis. However, since there are 4,000-5,000 coned pores per square inch in membrane 12, those skilled in the art will recognize that such pores are relative large and that the osmosis process will proceed at a relatively fast rate. Thus, the ability of the sulfates to move between the positive plates and the electrolyte is substantially uninhibited as is desired.

Importantly, a corona forms within the cavity defined by the conical sidewalls of the erupted pores, because the material from which the pores are formed has capacitance, i.e., the capacity to hold a charge. The presence of the corona creates a reverse osmosis effect. Accordingly, metallic ions cannot pass through the pores, and the undesirable process of plating, which plagues prior art batteries, is successfully prevented. However, water and non-metallic ions do pass through the pores, as is desired.

It is believed that the corona is strongest at the center of the pore, i.e., the effects of the corona may be coincident with the longitudinal axis of symmetry of each pore. This is highly desirable because water flowing through the open cones will flow fastest at the centers thereof, where the corona effect is believed to be the highest; thus, the effect is believed to be strongest where it is most needed.

The size and density of the pores varies with the application. For example, in an automotive battery where the plates are spaced about 0.040-0.065 inch apart, a suitable separator could be constructed of P6219, X6212, P6171 in equal parts. However, in batteries having closer battery spaces, a suitable separator construction would include in equal parts P3124, P6212, P3124.

The specific gravity of the materials disclosed herein is less than that of electrolyte; accordingly, the novel separators will float if immersed in electrolyte and not secured to the battery plates. Accordingly, they may be wrapped around the bottoms of the positive or negative plates as depicted in FIGS. 5 and 6.

For ease of handling battery assembly when protective members are used, they are seam, edge or tack bonded together. When wrapped around a plate the open ends may be bonded at the top of the plate. No edge bonding is necessary.

Thus, the ribs of some prior art separators are eliminated, with the result that the electrolyte is free to flow in all directions, substantially unimpeded.

The present invention thus allows the positive and negative plates of a battery to be positioned closer together vis a vis their spacing in prior art batteries; this decreases the electrical resistance of the battery which results in increased current produced by the battery. Alternately, where it is desired to maintain conventional plate spacing, the separators of this invention, since they occupy less volume than the prior art separators, allow more electrolyte to be charged into the interplate spaces which added electrolyte also increases battery performance.

More specifically, the following data has been compiled to show the amount of electrolyte space available for different plate spacings where the inventive separators are employed:

| Plate Spacing | Spacing Squared | Equivalent Separator Mass | Electrolyte Space Available |
|---|---|---|---|
| .045 | .002 | .00375 | .04125 |
| .040 | .0016 | .00375 | .03625 |
| .030 | .0009 | .00375 | .02625 |
| .025 | .000625 | .00375 | .02125 |

This data should be compared with the same data for the separators of the prior art as shown hereinabove.

As the above data show, conventional ribbed separators at 0.045 inch plate spacing are seen to have a resistance square of 0.002 and electrolyte space available of 0.025 inch while the present invention at 0.030 inch plate separation has a resistance square of 0.0009 and electrolyte space available of 0.02625.

This example shows that the resistance of a conventional separator construction is 2.2 times greater than the resistance of the present inventive separator.

Clearly, the present invention represents a major breakthrough in separator technology and as such is a pioneering invention. Accordingly, the claims appended hereto are entitled to broad construction, as a matter of law.

INDUSTRIAL APPLICATION

Lead acid batteries are used in countless industrial applications. Batteries equipped with the novel separators perform on a par with larger conventional batteries and excel conventional batteries of the same size.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A method of separating the plates of a battery, comprising the steps of:
inserting between battery plates a flexible, semipermeable membrane having about 4,000-5,000 open coned pores per square inch formed therein.

2. The method of claim 1, further comprising the step of disposing a pair of macroporous, flexible film members in sandwiching relation to opposite sides of said semi-permeable membrane, said macroporous members having 80-1,800 open coned pores per square inch formed therein.

3. The method of claim 1, further comprising the step of dimensioning the pores formed in said membrane to have a diameter of about 0.005 inch.

4. The method of claim 2, further comprising the step of dimensioning the pores formed in each of said macroporous film members to have a diameter of about 0.075-0.25 inch.

5. The method of claim 1, further comprising the step of dimensioning the membrane to have a thickness of about 0.00125 inch.

6. The method of claim 2, further comprising the step of dimensioning each of said macroporous film members to have a thickness of about 0.001-0.002 inch.

7. The method of claim 2, further comprising the step of forming said semi-permeable membrane and said macroporous film members from polyethylene.

8. The method of claim 1, further comprising the step of positioning said semi-permeable membrane in sandwiched relation between multiple layers of protective film members formed of a macroporous material.

9. A method of separating the plates of a battery, comprising the steps of inserting between adjacent battery plates a semi-permeable membrane having pores formed therein having a diameter sufficiently small to allow electrolyte to flow by the process of osmosis and forming said pores into an open cone shape so that a corona permits water and non-metallic ion flow therethrough while barring the flow of metallic ions.

10. The method of claim 9, further comprising the step of positioning said semi-permeable membrane in sandwiched relation between a pair of film members having a macroporous structure.

11. The method of claim 10, further comprising the step of forming in said macroporous film members open coned pore members having a diameter substantially larger than the diameter of the pores of said semi-permeable membrane.

12. The method of claim 11, further comprising the step of wrapping said membrane and macroporous film members around a bottom of a battery plate.

* * * * *